United States Patent
Porten et al.

(10) Patent No.: US 6,249,881 B1
(45) Date of Patent: Jun. 19, 2001

(54) METHOD FOR ENABLING AND SERVICING CRITICAL INTERRUPTS WHILE RUNNING AN INTERRUPT BASED DEBUG MONITOR

(75) Inventors: Joshua Porten, Palo Alto, CA (US); Amir Bar-Niv, Ramat-Gan (IL)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 08/884,200

(22) Filed: Jul. 1, 1997

(51) Int. Cl.[7] ................................................. G06F 11/00
(52) U.S. Cl. ................................................. 714/38
(58) Field of Search ................... 714/38; 395/704, 395/705, 706, 707, 712

(56) References Cited

U.S. PATENT DOCUMENTS

| | | | |
|---|---|---|---|
| 4,953,084 | * 8/1990 | Meloy et al. | 714/38 |
| 5,047,926 | * 9/1991 | Kuo et al. | 714/29 |
| 5,053,949 | * 10/1991 | Allison et al. | 714/31 |
| 5,357,628 | 10/1994 | Yuen | 714/34 |
| 5,394,544 | * 2/1995 | Motoyama et al. | 714/38 |
| 5,471,620 | 11/1995 | Shimizu et al. | 710/265 |
| 5,701,488 | * 12/1997 | Mulchandani et al. | 714/38 |

* cited by examiner

Primary Examiner—Robert W. Beausoliel, Jr.
Assistant Examiner—Pierre Eddy Elisca
(74) Attorney, Agent, or Firm—Limbach & Limbach L.L.P.

(57) ABSTRACT

A method for debugging an application on an embedded processor using a debug monitor service routine (debug ISR) and allowing critical interrupts to be transparently serviced is provided. The method enters and runs a debug monitor service routine transparently such that the application program being debugged is unaware of the monitor. A debug interrupt is completely transparent to the application software that runs on the embedded processor and is therefore non-maskable. In addition, when entering the debug ISR, shadow registers and the global interrupt disable bit (if they exist) are not be altered, which preserves the monitor's transparency to the application. Once the debug monitor is entered, a context save may be performed if needed and the monitor may proceed to enable interrupts if necessary. Using a second global interrupt enable/disable mechanism, distinct from, and in series with, the normal global interrupt enable/disable mechanism, the debug ISR can decide to enable or disable global interrupts. If an interrupt does occur while the debug monitor is running and interrupts are still enabled, that interrupt is serviced transparently to the debug monitor. Once the debugger releases the monitor it may exit, in a single atomic operation which avoids confusing a regular return from interrupt with a debug return from interrupt. If the debug monitor does not need to do a context save upon entering the debug ISR, the processor may be set to operate in mode where interrupts are not disabled upon entry into the debug ISR. However, the monitor may always opt to disable interrupts once the debug ISR is running. Upon exiting the debug ISR, the second global interrupt enable/disable mechanism is set to enable interrupts, thereby preserving the status of the normal global interrupt enable/disable mechanism.

19 Claims, 5 Drawing Sheets

100

HOST SYSTEM
(Running Debugger)

Target System
(Running Monitor & Application)

METHOD FOR ENABLING AND SERVICING CRITICAL INTERRUPTS WHILE RUNNING AN INTERRUPT BASED DEBUG MONITOR

BACKGROUND OF THE INVENTION

1. Field of the Invention

The present invention relates to electronic control and data processors and in particular, to debugging such processors as part of an embedded system while running a real time application. More particularly the present invention relates to an interrupt based debug method that allows critical interrupts to be transparently enabled and transparently serviced in real time while a debug interrupt service routine is running on the target system.

2. Description of the Related Art

An embedded system is typically a special purpose, preprogrammed processor that is built into another device, such as an automobile, a camera, a copy machine, or a disk drive. Software development for such embedded systems is distinct from software development for general-purpose platforms, such as personal computers and workstations. This is primarily because the software for embedded systems is typically very application specific and tied very closely to the underlying system hardware. In other words the application defines the hardware. In contrast, general purpose platforms, by definition, are designed to embrace a large variety of applications which are very loosely related to the underlying hardware platform, if at all. Thus, the architecture of an embedded processor requires special considerations for software development and debug.

Various approaches, with varying degrees of sophistication and effectiveness, in debugging computer systems, including embedded systems, have been developed. In fact, often times, multiple approaches must be employed to maximize the effectiveness of debugging.

One traditional approach employed by many computer systems is to provide diagnostic ports and corresponding read/write registers. An example of this approach is I/O Port 80H and its corresponding read/write register provided on a standard ISA system. Typically, external decode logic is coupled to the diagnostic ports for decoding the content of the registers and displaying diagnostic messages on a display device, for example, an array of LEDs. This approach is simple to implement. However, the obvious disadvantage is its limited functionality and poor usability.

Another traditional approach employed by many computer systems is to provide emulation support logic and a special emulation pin to the processor. The emulation support logic, when activated, floats all output to the processor. An example of this approach is found in the on-board circuit emulation pin of the "Intel386 TM SL" processor, manufactured by Intel Corporation of Santa Clara, Calif. Typically, an external emulation module with emulation logic is coupled to the special emulation pin to drive the output signals, thereby permitting testing of the overall computer system with the processor installed. This approach is more difficult to implement, but it provides more debugging functions then the previous approach. However, usability is still generally poor. In addition, this approach also has the inherent disadvantage that execution is not performed at the system's normal execution speed. Thus, certain problems, particularly hardware and software specific timing problems, might not be detectable.

Yet another traditional approach employed by many computer systems is to provide a software emulator for the computer system. The ICE-386 SL Emulator provided for the "Intel386 TM SL Superset" microprocessor system is an example of an emulator. This approach is more difficult to implement, but it provides more functions and better usability than the two previous approaches. The obvious disadvantage is the fact that execution is only emulated. Thus, many hardware problems may be undetectable and therefore, this approach is not useful for debugging embedded systems.

Thus, it is desirable to have an improved approach to debugging a computer system where the execution is not emulated and yet the debugging functions and their usability match or exceed those offered by the emulation approach. As will be described, these objects and desired results are among the objects and desired results achieved by the present invention.

Embedded software is usually developed on a host processor, such as a workstation. Once the program is complete, it is downloaded to the embedded processor from the host, executed, and debugged. A special purpose monitor function must exist on the embedded processor to enable this type of communication between the host and the embedded processor. The monitor must be able to receive the program from the host, store it in memory, execute it, and break the execution at a specified point to enable system debug. The monitor is typically part of the embedded processor and may be implemented in either software or in hardware. A software implementation actually runs on the embedded processor, similar to a special application, and a hardware implementation is included as part of the embedded processor itself. Software monitors are typically cheaper and more flexible to develop. They can also be later enhanced to support new debug features without having to change the silicon of the processor.

A software monitor communicates with the host via a special debug interrupt signal which initiates a debug interrupt service routine (ISR) or debug monitor routine. Typically, interrupts are immediately disabled upon starting any kind of interrupt service routine. This insures that the ISR can be started without being interrupted. This also allows the ISR to save the machine's context and then decide whether it wants to re-enable interrupts and support nested interrupts. Unlike regular ISRs however, prior art debug ISRs typically do not re-enable interrupts because during debug after a breakpoint, a programmer wants the processor to sit idle so he or she can examine the status of the machine without it changing.

For instance, if a breakpoint occurs, the embedded processor enters a debug ISR, the debug monitor takes over, interrupts are disabled, and the monitor awaits instructions from the host system. The embedded processor will only exit the debug ISR once the user, via the debugger running on the host processor, instructs the target system to continue with program execution. This can obviously take a long time relative to real time events that need to be serviced by the target system—anywhere from a few seconds to possibly hours. Such a period of ignoring critical interrupts for real time events could be devastating to a real time system that requires immediate attention to interrupts, such as hard disk drives. In a disk drive, if the servo loop is not maintained, the head may crash, causing irreversible damage. Less devastating but potentially problematic, in a modem, if arriving data interrupts are ignored, incoming data is lost.

In order to avoid this problem, what is needed is a way to service critical interrupts for real time events that should not be ignored even during debug. This will enable the development and debug of real time systems without putting the actual embedded system at risk. In addition, system operation may proceed throughout the debug session. Other examples of such systems are production control systems, speech and voice systems, communication systems, etc.

Prior art debug systems have failed to teach a method for transparently servicing critical interrupts. Typically, prior art systems disable interrupts during debug. Any prior art system that allow interrupt during debug require that the application programmer is aware of the need to service critical interrupts. Such prior art systems typically require the programmer to define special service routines just for handling interrupts that occur while the monitor is in control of the system.

Some prior art systems require the use of two separate tables for interrupt vectors: one for interrupts occurring while an application program is running and the second for interrupts occurring while a debugging program is running. Such a scheme requires a separate vector controller to map the interrupts to the appropriate vector table, depending on the state of the processor (debug or application state). The programmer must be aware of the interrupts being serviced during debug and thus, complicates the debug process. Essentially, in such prior art systems, interrupts may not be disabled during debug and the debug ISR is not transparent to the application developer. A second, separate, vector table must be used.

What is needed then is a means for transparently enabling and transparently servicing critical interrupts for real time events that occur while an interrupt based debug monitor routine is running.

SUMMARY OF THE INVENTION

The above and other objects of the invention are achieved by the present invention of a method to enable critical real time interrupts during the servicing of an interrupt. In particular the present invention allows an embedded systems programmer to develop and debug his software in real time. It includes a method for responding to a non-maskable debug interrupt (debug NMI) by transparently entering a debug monitor routine (debug ISR). It further provides a method for servicing critical interrupts from within a debug monitor routine without disrupting the state of the machine and thus, without complicating the process of debugging the machine. As an option, interrupts may be either enabled or disabled from within the debug ISR.

These and other features and advantages of the present invention will be understood upon consideration of the following detailed description of the invention and the accompanying drawings.

DETAILED DESCRIPTION OF THE PREFERRED EMBODIMENT

Figure 1:
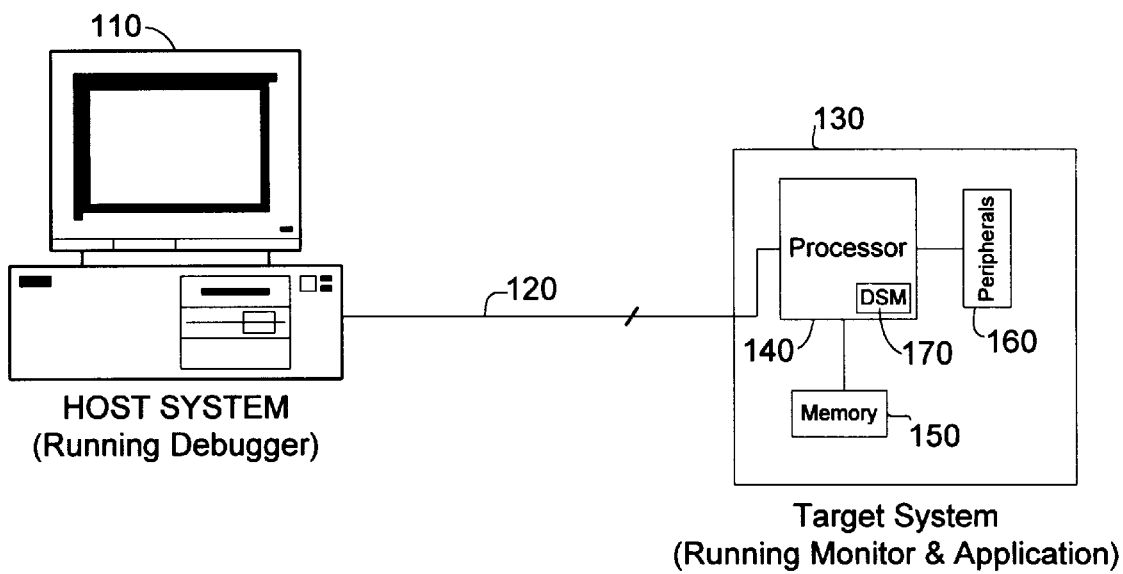
FIG. 1 is a block diagram of the hardware used for debugging an embedded system according to the present invention.

The present invention allows a processor to service critical interrupts despite the fact that it is already servicing a debug interrupt service routine. This permits for example, a programmer to debug real time control systems, and the like, while the control systems are connected to the devices they control. Turning to FIG. 1, a simplified block diagram depicts an example embodiment of a debug system 100 according to the present invention. A host system 10 runs a debugger program that communicates, via a communication link 120, with a target system 130. The communication link 120 will typically include data signals, a clock signal, a strobe signal, and a special debug interrupt signal. The protocol used for transmitting and receiving these signals can be RS-232C or any suitable protocol.

The target system 130 includes an embedded processor 140, associated memory 150 and some peripheral devices 160 under the control of the processor 140. Although the memory 150 is shown as separate from the processor 140, it should be understood that memory systems in embedded processors are typically on the processor chip. The present invention works with on chip, off chip, or any combination of on and off chip memory systems. It is the peripheral devices 160 that will typically generate the critical interrupts that should not be ignored. It should be understood that the processor 140 could be any type of processor, not necessarily an embedded one. The processor 140 includes a debug support module (DSM) 170 which contains support logic, output registers, and configuration and control registers.

The processor 140 is configured to run a monitor routine and an application program. The monitor routine is the system software that communicates, via the communication link 120, with the debugger running on the host system 110. Alternatively, the monitor can be implemented exclusively in hardware. It is the application program, which includes interrupt service routines (ISRs), that normally would respond to the critical interrupts generated by the peripheral devices 160 but would typically be halted under debug conditions.

Figure 2:
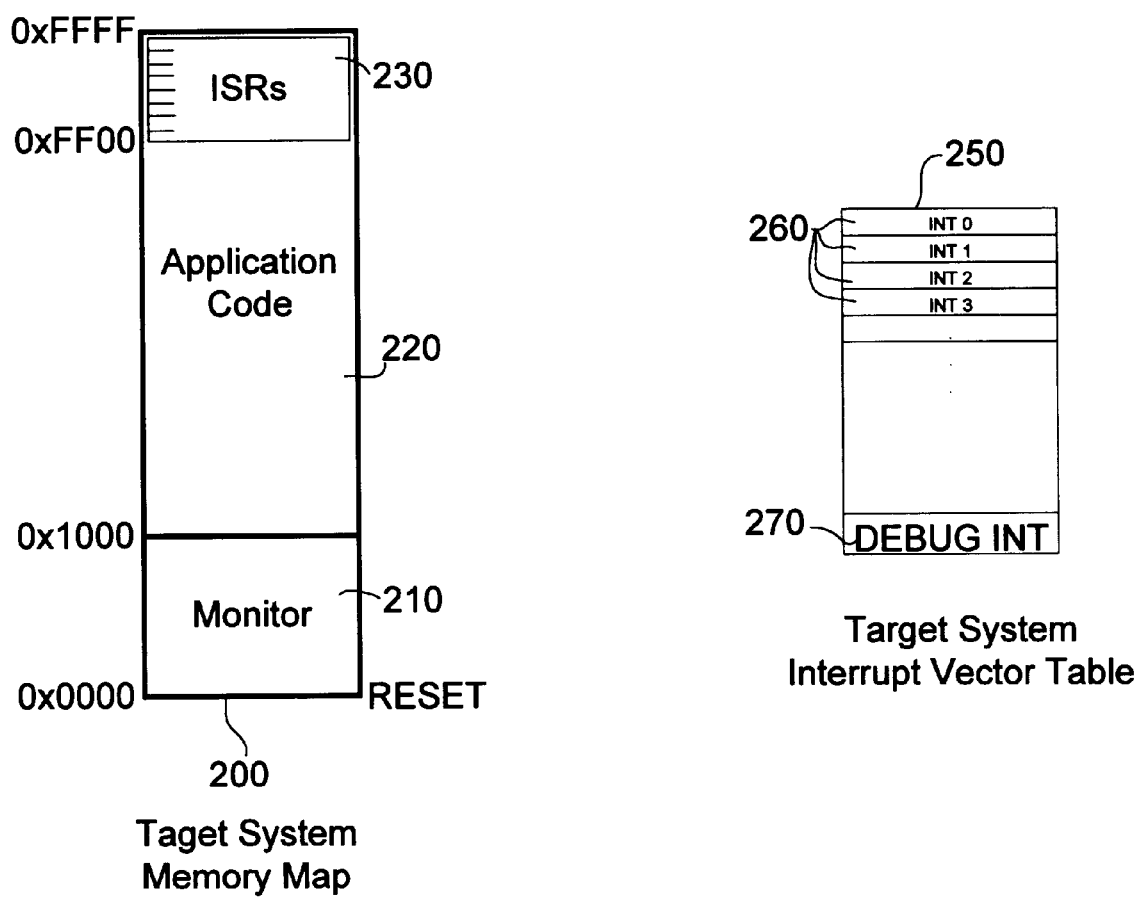
FIG. 2 is an example memory map and interrupt vector table of an embedded system according to the present invention.

Turning to FIG. 2, a memory map 200 of the memory 150 of the processor 140 of the target system 130 is depicted. While the monitor routine 210 is shown occupying lower memory 150 and the application program space 220 is shown in upper memory 150, it should be understood that these components can be located anywhere in the memory 150. As mentioned above, the application program space 220 includes space for interrupt service routines 230. The interrupt vector table 250 includes a list of addresses 260 that point to the location 230 of their respective ISRs in memory 150 that represent the start of the different interrupt service routines. One special interrupt vector table entry 270 contains the address of the debug monitor routine space 210. Upon receipt of an interrupt, the processor 140 jumps to the address 260, 270 given in the interrupt vector table 250 that corresponds to the identity of the particular interrupt signal. The processor 140 begins to execute commands it finds at the location specified by the vector table 250. In the case of a debug interrupt, the processor runs starting at the monitor routine space 210. Once the interrupt has been serviced, the processor 140 returns to the application code from where it originally came.

Figure 3:
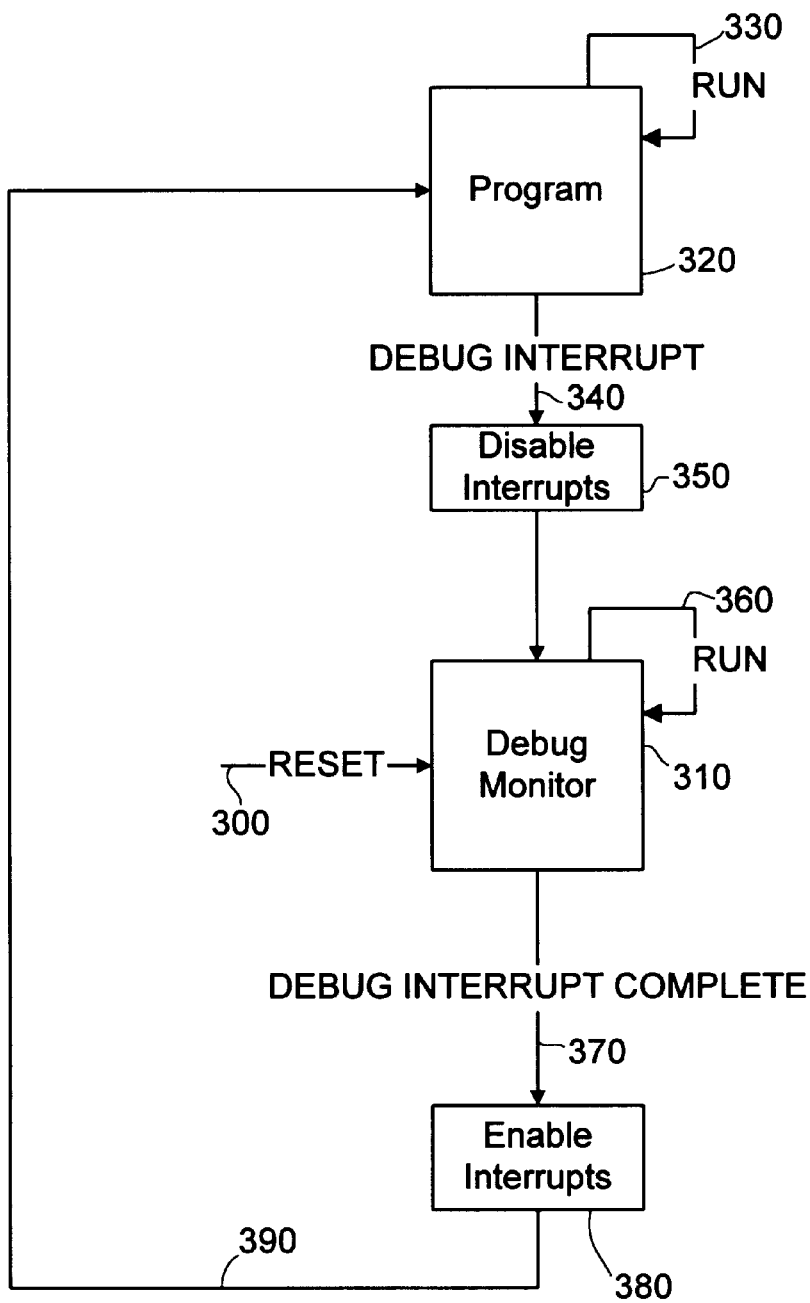
FIG. 3 is a block diagram depicting the relationship of a prior art application program and a prior art debug monitor routine.

FIG. 3 is a block diagram that depicts the transitions between a prior art application program 320 and a prior art debug monitor routine 310. After the target system 130 receives a reset signal 300 from the host system 110 or from an on-board source, the monitor 310 boots the system, enables interrupts 380 and branches to the start of the program 320. The application program remains running freely 330, servicing interrupts and performing normal operations. Upon receipt of a debug interrupt 340, prior art debug systems globally disable interrupts 350 by setting a processor global interrupt disable bit. At this point, the application program releases control of the target processor to the debug monitor routine 310. The prior art debug monitor 310 runs 360 freely without servicing any interrupts until the programmer has the monitor release the system back to the application program by having the host send a debug interrupt finished signal 370 to the target system 130. Interrupts are globally enabled 380 by resetting the processor global interrupt disable bit and control is returned 390 to the application program 320.

In contrast, the present invention allows interrupts to be enabled while the monitor is running. Further, the present invention services these interrupts without disrupting the debugger's use of the monitor routine. Thus, interrupts are serviced transparently to a programmer using the debugger and the monitor routine is entered transparently to the application program. In particular, this means that any global interrupt disable bit, used in prior art systems upon entry into the debug interrupt service routine to signal that interrupts are to be globally disabled, is not altered by the debug monitor of the present invention.

Instead, the present invention uses a second, parallel mechanism to disable interrupts. This second, parallel mechanism, called a monitor global interrupt disable bit, is embodied within the debug support module (DSM) 170 of the processor 140 of FIG. 1. In its simplest form, the logic to support the monitor global interrupt disable bit comprises an AND gate in series with the logic that supports the processor global interrupt disable bit. In the same well known way that the processor global interrupt disable logic can disable interrupt signals, so too can the DSM's monitor global interrupt disable support logic. Either of these two different disable functions, which are in series with each other, can independently gate the interrupt signals. However, the interrupt signals can only get through if neither disable function is active.

Figure 4:
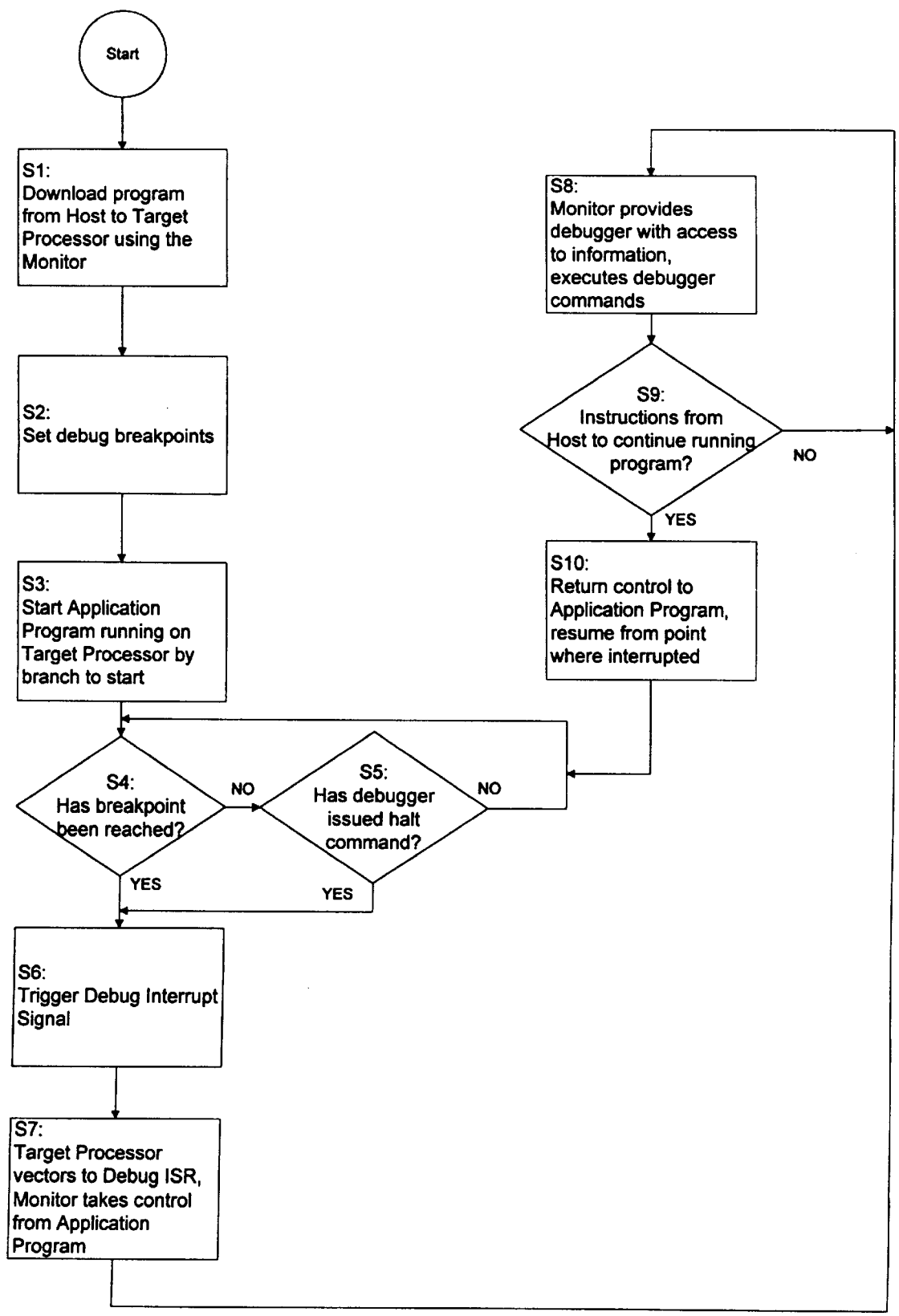
FIG. 4 is a flow chart depicting the steps of the method of the present invention.

Turning to FIG. 4, a flow chart depicting an example set of steps of the method of the present invention is shown. In Step S1, the application program is downloaded into the application space 220 of the memory 150 of the target system 130 from the host system 110 using the monitor routine 210. Next, in Step S2, the programmer, running the debugger software on the host system 110, sets breakpoints or defines conditions in which the target processor 140 should be halted.

In Step S3, the monitor 210 relinquishes control of the target processor 140 to the application program by branching to the starting address of the application space 220 of FIG. 2. The application runs freely, controlling the peripherals, servicing interrupts, and performing normal operations. This continues until in Step S4 or Step S5 where either a breakpoint or halt condition is reached. If either a breakpoint of halt is reached the program advances to Step S6. Otherwise the application continues to execute as before.

Upon reaching Step S6, a special non-maskable debug interrupt signal (debug NMI) is triggered which causes Step S7 to occur. In Step S7, the target processor 140 vectors to the address of the debug ISR 210 of FIG. 2. The monitor routine takes control of the target system 130 of FIG. 1. At this point, the system enters Step S8 in which the monitor stands by, providing the debugger with access to information about the state of the target system 130.

Upon receipt of a debugger command, the system enters Step S9, in which the monitor executes the command received from the debugger. The monitor remains in control of system, responding to debugger commands, until the programmer has the debugger issue an application resume command. As will be described in reference to FIG. 5 below, the target system may continue to service interrupts while in Step S9. Once the resume command is issued and detected in Step S10, the monitor relinquishes control of the processor and the application continues from the point at which it was interrupted. The system returns to normal operation and looping between Steps S4 and S5, waiting for the next breakpoint or halt command.

Figure 5:
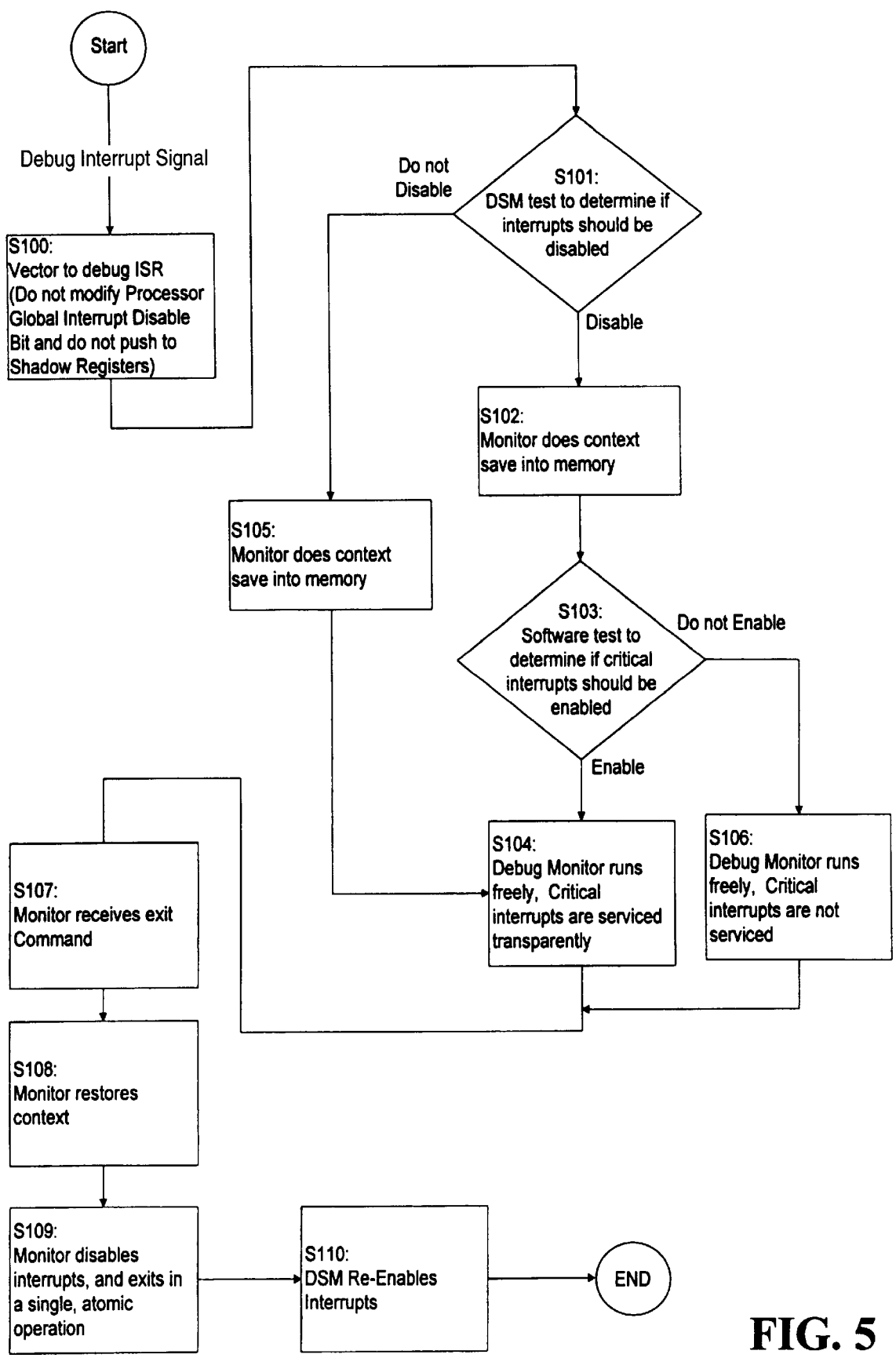
FIG. 5 is a flow chart depicting the details of Steps S7 through S10 of FIG. 4 according to the present invention.

Turning now to FIG. 5, the details of Steps S7 through S10 of FIG. 4 are more fully described. Upon receipt of the non-maskable debug interrupt signal, the system enters Step S100 in which the target processor vectors to the debug ISR. To preserve the transparency of the debug ISR to the application program, the present invention does not perform two functions that prior art systems would normally perform at this point. First, as discussed above with reference to FIG. 3, the processor global interrupt disable bit is not modified. Second, if the processor has shadow registers for performing very fast context saves of the most frequently used registers, the contents of the most frequently used registers are not pushed into the shadow registers. In other words, unlike prior art systems entering into a debug monitor routine, the present invention does not alter the processor global interrupt disable bit nor does it use the shadow registers as it enters its debug monitor routine. In addition, the present invention does not alter any other status or control bits of the processor that may affect normal application execution.

After vectoring to the monitor program in Step S100, the present invention, in Step S101, performs a hardware based test of the contents of configuration registers within the DSM 170 to determine if the programmer wants interrupts to be disabled while running the debug monitor. If not, the monitor performs a context save in Step S105 and proceeds to Step S104. If so, the monitor performs a context save in Step S102 and proceeds to Step S103 where the present invention provides the programmer with another opportunity to re-enable interrupts based on a number of debugger controllable tests and/or conditions. In both Steps S101 and S103, the monitor uses the DSM's monitor global interrupt disable bit, as opposed to the processor global interrupt disable bit, to turn off interrupts without disturbing the application program status. Whether or not interrupts are enabled, the monitor saves the context of the system, without using shadow registers, in Steps S102 or S105 if necessary.

After Steps S101 and/or S103, the system is in one of two different states: either interrupts are enabled or they are disabled. It should be understood that while the invention has been described thus far as enabling and disabling all interrupts, the system of the present invention provides means to enable and disable any subset of interrupts, including a set of selected critical interrupts for servicing critical events in real time. If interrupts are enabled, the system is in Step S104 and the debug monitor runs freely, responding to debugger commands and transparently running ISRs in response to interrupts. If interrupts are disabled, the system is in Step S106, the debug monitor runs freely, responding to debugger commands but interrupts are not serviced. Regardless of whether interrupts are enabled or not, once inside the monitor (i.e. Steps S104 or S106), interrupts can be enabled or disabled by the debugger via the monitor. Also, in either case, the system moves to Step S107 once the monitor receives the exit or resume application command from the host system.

After receiving the exit command, the system moves to Step S108 in which the monitor restores the processor's context if necessary. Next, in Step S109, the monitor disables interrupts (regardless of their current state) using the DSM's monitor global interrupt disable bit and exits in a single, atomic operation. Finally, in Step S110, the DSM 170 re-enables interrupts which restores the system to the same state it was in before it entered the debug monitor.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for debugging an application program having interrupt service routines and running on a processor, the method comprising the steps of:

defining a condition that will trigger a first interrupt signal indicating a debug monitor Program should be entered;

detecting the condition and in response, triggering the first interrupt signal;

entering and running a first interrupt service routine, in response to the first interrupt signal, operable to allow debug of the application program and provide access to status, state, and control of the processor, wherein the first interrupt service routine is entered so that critical interrupts can be serviced without losing state information of the processor while the first interrupt service routine is running and the application program is halted but not otherwise affected by the first interrupt service routine being entered;

enabling a second interrupt signal indicating the occurrence of a critical event, from within the first interrupt service routine, to trigger in response to a predefined event; and entering and running a second interrupt service routine in response to the second interrupt signal, wherein the second interrupt service routine is operable to service the critical event and runs as if it was called during execution of the application program and wherein the first interrupt service routine is halted while the second interrupt service routine is run, but is not otherwise affected by the second interrupt service routine being run.

2. The method of claim 1 further including the steps of:

testing a configuration register upon entering the first interrupt service routine to determine if the second interrupt signal should not be enabled; and disabling the second interrupt signal based on a positive outcome of the testing a configuration register step by gating the second interrupt signal using a first interrupt service routine gating means distinct from an application program controlled processor interrupt disable means.

3. The method of claim 2 further including the steps of:

testing the processor's status after entering the first interrupt service routine to determine if the second interrupt signal should be re-enabled if it has been disabled; and re-enabling the second interrupt signal based on a positive outcome of the testing the processor's status step by using a first interrupt service routine enabling means distinct from an application program controlled processor interrupt enable means.

4. The method of claim 3 further including the step of:

saving the context of the processor as it was before entering the first interrupt service routine while running the first interrupt service routine but before running the second interrupt service routine, wherein the context is saved without the use of shadow registers or other devices dedicated to recording processor status.

5. The method of claim 4 further including the step of:

restoring the context of the processor as it was before entering the first interrupt service routine while running the first interrupt service routine but after running the second interrupt service routine.

6. The method of claim 5 further including the steps of:

disabling the second interrupt signal by gating the second interrupt signal using the first interrupt service routine gating means which is distinct from the application program controlled processor interrupt disable means;

exiting the first interrupt service routine in a single, atomic operation; and re-enabling the second interrupt signal by using the first interrupt service routine enabling means which is distinct from the application program controlled processor interrupt enable means.

7. A method for debugging an application program having a debug monitor service routine, a plurality of critical interrupt service routines, and running on a processor, the method comprising the steps of:

defining a condition that will trigger a debug interrupt signal;

detecting the condition and in response, triggering the debug interrupt signal;

entering and running a debug monitor service routine, in response to the debug interrupt signal, that provides access to status, state and control of the processor, wherein the debug monitor service routine is entered so that critical interrupts can be serviced without losing state information of the processor while the debug monitor service routine is running and the application program is halted but not otherwise affected by the debug monitor service routine being entered;

enabling a plurality of critical interrupt signals, from within the debug monitor service routine, to trigger in response to a real time event; and entering and running a critical interrupt service routine in response to one of the plurality of critical interrupt signals, wherein the critical interrupt service routine runs as if it was called during execution of the application program and wherein the debug monitor service routine is halted while the critical interrupt service routine is run, but is not otherwise affected by the critical interrupt service routine being run.

8. The method of claim 7 further including the steps of:

testing a configuration register within the processor upon entering the debug monitor service routine to determine if the plurality critical interrupt signals should not be enabled; and disabling the critical interrupt signals based on a positive outcome of the testing a configuration register step by gating the critical interrupt signals using a monitor global interrupt disable bit which is distinct from a processor global interrupt disable bit.

9. The method of claim 8 further including the steps of:
testing the processor's status after entering the debug monitor service routine to determine if the plurality of critical interrupt signals should be re-enabled if they have been disabled; and
re-enabling the plurality of critical interrupt signals based on a positive outcome of the testing the processor's status step by setting a monitor global interrupt enable bit which is distinct from a processor global interrupt enable bit.

10. The method of claim 9 further including the step of:
saving the context of the processor as it was before entering the debug monitor service routine while running the debug monitor service routine but before running a critical interrupt service routine, wherein the context is saved without the use of shadow registers or other devices dedicated to recording processor status.

11. The method of claim 10 further including the step of:
restoring the context of the processor as it was before entering the debug monitor service routine while running the debug monitor service routine but after running a critical interrupt service routine.

12. The method of claim 11 further including the steps of:
disabling the plurality of critical interrupt signals by gating the plurality of critical interrupt signals using the monitor global interrupt disable bit which is distinct from the processor global interrupt disable bit;
exiting the debug monitor service routine in a single, atomic operation; and
re-enabling the plurality of critical interrupt signals by setting the monitor global interrupt enable bit which is distinct from the processor global interrupt enable bit.

13. A method for enabling and servicing critical interrupts of an debug monitor service routine which has interrupted an application program running on a processor, the method comprising the steps of:
entering the debug monitor service routine transparently to the application program so that critical interrupts can be serviced without losing state information of the processor while the debug monitor service routine is running;
enabling critical interrupts;
detecting a critical real time event; and
responding to the real time event by running a corresponding critical interrupt service routine wherein the debug monitor service routine is halted while the critical interrupt service routine runs but is not otherwise affected by the critical interrupt service routine running.

14. A system for debugging an application program having interrupt service routines and running on a processor, the system comprising:
means for defining a condition that will trigger a first interrupt signal;
means for detecting the condition and in response, triggering the first interrupt signal;
means for entering and running a first interrupt service routine, in response to the first interrupt signal, that provides access to status, state and control of the processor, wherein the first interrupt service routine is entered so that critical interrupts can be serviced without losing state information of the processor while the first interrupt service routine is running and the application program is halted but not otherwise affected by the first interrupt service routine being entered;
means for enabling a second interrupt signal, from within the first interrupt service routine, to trigger in response to a predefined event; and
means for entering and running a second interrupt service routine in response to the second interrupt signal, wherein the second interrupt service routine runs as if it was called during execution of the application program and wherein the first interrupt service routine is halted while the second interrupt service routine is run, but is not otherwise affected by the second interrupt service routine being run.

15. The system of claim 14 further including:
means for testing a configuration register upon entering the first interrupt service routine to determine if the second interrupt signal should not be enabled; and
means for disabling the second interrupt signal if the means for testing a configuration register would result in a positive outcome, wherein a first interrupt service routine gating means, distinct from an application program controlled processor interrupt disable means, is used to gate the second interrupt signal.

16. The system of claim 15 further including:
means for testing the processor's status after entering the first interrupt service routine to determine if the second interrupt signal should be re-enabled if it has been disabled; and
means for re-enabling the second interrupt signal if the means for testing the processor's status would result in a positive outcome, wherein a first interrupt service routine enabling means, distinct from an application program controlled processor interrupt enable means, is used to re-enable the second interrupt signal.

17. The system of claim 16 further including:
means for saving the context of the processor as it was before entering the first interrupt service routine while running the first interrupt service routine but before running the second interrupt service routine, wherein the context is saved without the use of shadow registers or other devices dedicated to recording processor status.

18. The system of claim 17 further including:
means for restoring the context of the processor as it was before entering the first interrupt service routine while running the first interrupt service routine but after running the second interrupt service routine.

19. The system of claim 18 further including:
means for disabling the second interrupt signal by gating the second interrupt signal using the first interrupt service routine gating means which is distinct from the application program controlled processor interrupt disable means;
means for exiting the first interrupt service routine in a single, atomic operation; and
means for re-enabling the second interrupt signal by using the first interrupt service routine enabling means which is distinct from the application program controlled processor interrupt enable means.

* * * * *